Dec. 30, 1952 J. F. ENGLISH, JR., ET AL 2,624,012
RADIANT ENERGY MEASURING SYSTEM
Filed April 2, 1949 4 Sheets-Sheet 1

FIG. 1

INVENTORS
JAMES F. ENGLISH JR.
AND ANTHONY J. HORNFECK
BY
Raymond W. Jenkins
ATTORNEY

*INVENTORS*
JAMES F. ENGLISH JR.
AND ANTHONY J. HORNFECK
BY
Raymond W. Jenkins
*ATTORNEY*

INVENTORS
JAMES F. ENGLISH JR.
AND ANTHONY J. HORNFECK
BY
Raymond W. Jenkins
ATTORNEY Patented Dec. 30, 1952

2,624,012

UNITED STATES PATENT OFFICE 2,624,012

RADIANT ENERGY MEASURING SYSTEM

James F. English, Jr., Lakewood, and Anthony J. Hornfeck, Lyndhurst, Ohio, assignors to Bailey Meter Company, a corporation of Delaware Application April 2, 1949, Serial No. 85,082

16 Claims. (Cl. 250—83.3)

Our invention is directed to thermal radiation sensitive or measuring circuits and particularly to circuits and apparatus sensitive to total radiation from a source, in contra-distinction to systems which are by their very nature selective and therefore sensitive only to definite bands or lines of spectral radiation. Thermal radiation or thermal radiant energy may be defined as that radiation, emitted by a body or substance, usually only by solids or liquids, whose quantity and quality depends on the temperature and emissivity of the body or substance. The spectral distribution of emissive power is continuous and changes smoothly with temperature through infra-red, the visible band and into ultra-violet.

Among the most common commercial applications of our system, may be mentioned:

1. Meters which operate to determine the radiation reaching a target from a source after passing through a medium in which may be dispersed radiation absorbing or obstructing solid particles. Thus, may be measured the volume density of smoke in the products of combustion, the turbidity of a liquid, or the like.

2. Instruments for detecting or advising the presence or absence of light or flame or the movement of radiating bodies past a target.

3. Instruments for measuring temperature through the receipt of total thermal radiation from an object or a space whose temperature is to be ascertained.

In each of these applications (examples without being limitations) it will be evident that the use of total thermal radiation or of a band of such radiation is pertinent to proper measurement. Our invention is, in its broader aspects, universal in its use because of its sensitiveness to total radiation and by not being limited in application to a definite band such as the band of visible radiation.

Many advantages are inherent in our invention and we have chosen to illustrate and describe our invention by way of three embodiments, namely, one for each of the general applications above mentioned. This is not to be considered as limiting however but merely as explanatory.

A particular object of our invention is in the provision of a circuit and apparatus useful in detecting or measuring thermal radiation. A further object is in the provision of such a system which may be sensitive to total thermal radiation or may be arranged to be sensitive to a selected band of such radiation.

Still another object is the provision of a system sensitive to thermal radiation for ascertaining the amount of such radiation passed through or by an obstruction for determining the magnitude of the obstruction.

A further object lies in the provision of a system sensitive to thermal radiation for advising the presence or absence of such radiation or the presence or absence of a given band of thermal radiation.

Yet another object is the provision of a system sensitive to thermal radiation for determining the temperature of the source.

With these and further objects in mind we will describe certain preferred embodiments of our invention in connection with the drawing, in which.

Figure 1:
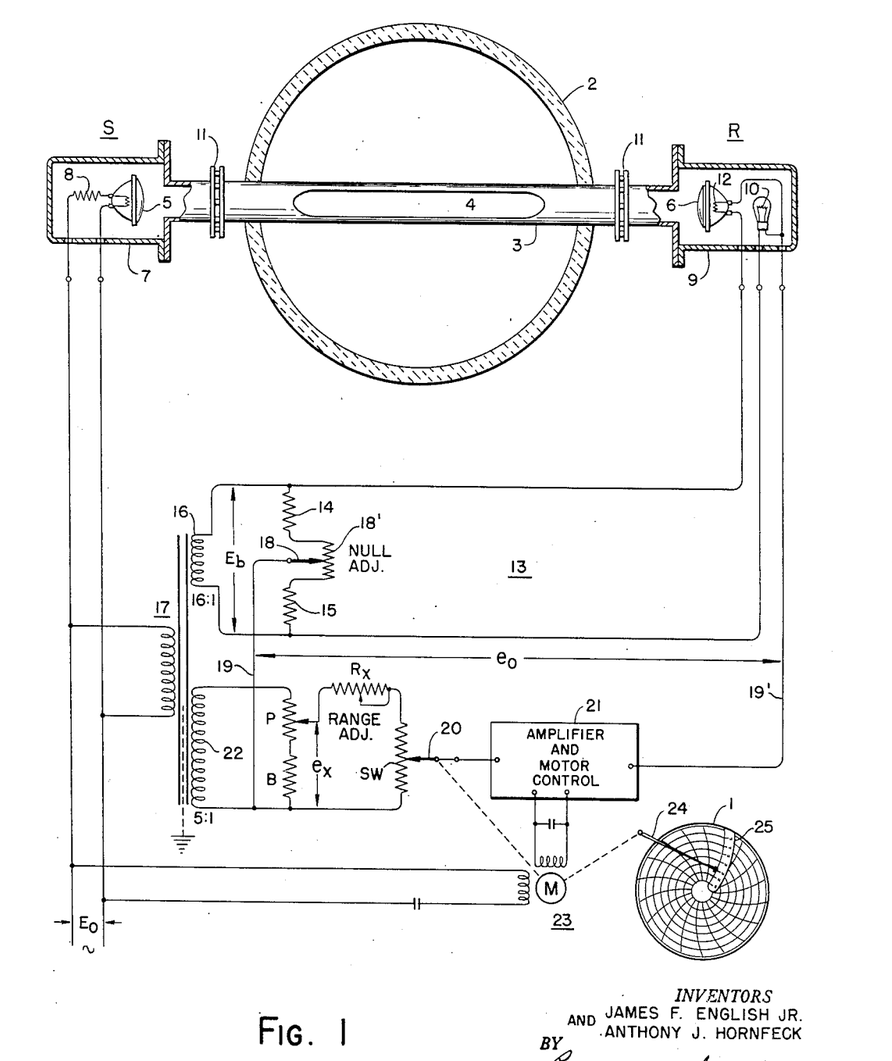
Fig. 1 diagrammatically illustrates a smoke-density measuring system.

Referring now in particular to Fig. 1 it will be seen that the arrangement is adapted to continuously record upon a chart 1 the smoke density of the products of combustion passing through a stack 2.

The term "smoke density" as commonly used in this art is really a misnomer but has an established meaning. Density of any substance is defined as its weight per unit volume. "Smoke density" may arbitrarily be defined as the percent volume of the gas which is occupied by solids with no reference to the unit weight of the fluid nor the percentage weight of the carbon, dust, or other solids dispersed in, or carried along by, the fluid.

Again a fallacy exists in the usage of "smoke density," particularly in connection with city ordinances which stipulate the allowable smoke which may be emitted from a stack. These are usually stated in terms of "smoke density" actually meaning "color," i. e. whether the smoke is black or light gray. A better determination of the extent of atmospheric pollution would be by light obstructing extent which would depend on solids in the smoke irrespective of whether they be dark carbon or lighter colored ash. None of these methods, however, take into account the volume of fluid emitted per unit time in which the solids are carried.

Carbon and ash emitted by a stack are undesirable for two principal reasons. Pollution of the atmosphere and surrounding structures is caused by both carbon and ash. Additionally, the presence of carbon in the flue gases indicates inefficient combustion conditions and a waste of fuel. The presence of ash in the flue gas does not necessarily indicate a waste of fuel but does cause a nuisance and should be prevented. Unfortunately "color" of the smoke tends to show up only the blacker carbon and, because of its lighter color, tends to neglect the discharge of ash or cinders, particularly from pulverized coal firing, to the atmosphere. Thus smoke measure, based on "color" is inadequate and a "smoke density meter" must be sensitive to volume density of light absorbing or obstructing solids regardless of color. Due to cost and complication it may, at present, be inopportune to insist on a complete measurement of weight rate of discharge of solids to the atmosphere, involving not only a "smoke density" meter but also a volume rate meter. With this in mind we provide an improved "smoke density" meter for continuously determining the volume density of solids in the products of combustion. Our meter may be calibrated in arbitrary units such, for example, as percent smoke, wherein, for a calibrated system the meter reads zero smoke when no radiation absorbing or obstructing particles are present in the path of radiation, or 100% smoke when enough (or more) radiation absorbing or obstructing particles are present to substantially completely intercept the beam of radiation. Between the limits of 0 and 100% smoke (so defined) the index may be graduated linearly although a true linear relation does not exist between "smoke density" and radiation absorption and obstruction.

In Fig. 1 we illustrate a "smoke density" measuring system which is qualitative rather than quantitative, based upon a continuous determination of the amount of "total thermal radiation" from a source which reaches a target after passing through a path of fixed dimension in which is flowing a sample stream of the products of combustion bearing radiation absorbing or obstructing materials. The instrument does not depend upon "color" and is therefore sensitive to the presence not only of carbon particles but also to the presence of ash or dust.

The stack 2 is shown diagrammatically in horizontal section and to quite diminished scale compared to the rest of the apparatus of Fig. 1. For example the stack may be 10 to 15 ft. in diameter and is horizontally traversed by a radiation path tube 3 which may be 4 inch pipe having a slot 4 of 3½ inch width and 5 ft. in length so located as to provide a free vertical flow of the flue gases through the slot, thus continually presenting a sample stream of uniform cross section to the beam of radiation directed longitudinally through the tube 3 from a source S to a receiver R.

Irrespective of dimensions of the stack or duct 2 or distance between S and R it is, for uniformity of calibration, etc., highly desirable that a uniform size cross section of sample flow, such as limited by slot 4, be provided. This will readily be appreciated because the system is based upon determining the extent of radiation absorption by the sample flow when zero smoke means a clean sample flow and 100% smoke means complete absorption, or obstruction, of the radiation from S by the sample flow. For example, 100% obstruction (radiation absorption) may mean very heavy smoke in a 5 ft. sample stream and relatively light smoke in a 20 ft. sample stream. Furthermore, the measurement depends not only on distance through the sample stream but the relation between radiation absorbed and actual "smoke density" is non-linear which recommends a relatively short sampling system. We have found that the slot 4 should preferably be about 5 ft. in length for most installations although we provide means for compensating the circuit for other lengths of sample path.

The source of thermal radiation S is preferably a commercial sealed-beam spotlight 5 of about 150 watts and having a mirrored reflector concentrating the thermal radiation in a path longitudinally through the tube 3 in the direction of the receiver R. Such a light has a total radiant energy distribution of about 20% in the visible and 80% in the infra-red range of the radiation spectrum. This distribution is not dissimilar from other ordinary tungsten light sources but the mechanical construction provides a desirable concentration of radiation through the path of the sample.

The receiver R includes a detector 6 in the form of a bolometer sensitive to total thermal radiation received by the target 12 and therefore limited in sensitivity only by the window.

A "bolometer" is usually defined as a device sensitive to total thermal radiation for producing an effect representative of the energy level of radiation received. In our usage herein we limit the bolometer to the electric resistance type wherein the change in temperature of the target of the bolometer due to receipt of radiant energy varies the electrical resistance of the target. It is in effect an electrical resistance thermometer of the A.-C. type.

In actual structure the bolometer 6 is fully described and claimed in the copending application of Victor S. Rutherford and James F. English, Jr., now Patent 2,524,478. A glass housing consists of two parts, an internally mirrored paraboloidal reflecting section, and a window section, sealed together and the housing evacuated. A target comprising a tungsten filament is located at the focal center in the plane of the latus rectum of the paraboloidal reflecting surface. The arrangement provides that the target receives several hundred times the radiant energy that it would otherwise receive by direct impingement alone upon the target. The evacuation of the housing containing the reflecting surface and target minimizes loss of incident radiation (by conduction and convection) after once reaching the target. The window facing the source S is usually of clear glass for closing the evacuated target housing and permits substantially free ingress of visible and the greater portion of the infra-red radiation. Such a window excludes substantially all ultra-violet radiation but as our source radiates substantially no ultra-violet through its own window we admit to the target and reflecting surface substantially all of the radiation from the source when the path is unimpeded by smoke. In arrangements where the source has no visible and only a low level of infra-red energy we may make the window of quartz or other material which will pass a larger proportion of infra-red.

The source S includes a housing 7 aligned with the sample tube 3 and in which the radiation source 5 is rigidly supported in a manner such that its radiation is directed as a beam through the tube 3 toward the target 12. Also located in the housing 7 is a resistor 8 connected in series with the radiation source 5 to insure long life.

The receiver R includes a housing 9, similar to housing 7, and containing the bolometer 6 as well as a compensating filament 10 housed in an evacuated glass envelope. The bolometer 6 is so mounted in the housing 9 as to look at the radiation beam which is directed upon it through the tube 3 by source 5. On the other hand compensating filament 10 is shielded from the radiation beam and is sensitive only to ambient temperature to which the bolometer is subjected.

Both the assemblies S and R are spaced from the stack 2 any convenient distance which may be determined for an installation by mounting facilities or ease of access. It is not necessary that S and R be any minimum distance from the stack 2 from the standpoint of damage or inaccuracy caused by stack or other ambient temperatures.

The housings 7 and 9 are preferably attached to tube 3 by spaced flanges 11 to provide infiltration of clean air towards the stack which is usually under negative pressure. Such arrangement prevents smoke from filling the tube 3 and housings 7, 9 and insures a fixed size of sample stream 4 through which the radiation beam is directed. It also contributes to cleanliness of the radiation source 5 and the bolometer 6. The rigid mounting of S and R to the tube 3 insures that the radiation beam will be properly directed upon the bolometer 6 through the fixed dimension sample fluid stream passing through slot 4.

The target filament 12 of bolometer 6 and the compensating filament 10 form two legs of an A.-C. bridge network 13 having two fixed resistance legs 14 and 15. The bridge is supplied with alternating current from the secondary winding 16 of a transformer 17 at about 7.5 volts. A manual null adjustment 18 joins the resistances 14, 15 to a conjugate conductor 19 whose extension 19' joins the junction of resistance legs 10, 12. The arrangement provides a bridge including elements 10, 12, 14, 15 and 18'. If the bridge is in balance no voltage will show in conductor 19, 19' and this is the calibrated condition at 100% smoke (complete radiation obstruction). On the other hand the amount of unbalance of the bridge will be evidenced in conductor 19, 19' by the magnitude of an A.-C. voltage $e_0$.

The conductors 19, 19' join an A.-C. voltage balance circuit including manual range adjustment P, resistors B, Rx, SW, contact 20, amplifier and motor control circuit 21, and a secondary 22 of the transformer 17. The secondary 22 supplies the circuit with alternating current of about 20 volts acros P and B which, with Rx, provide a voltage to be compared to the unbalance voltage across SW. The value B is normally about 3P and P (the range adjustment) is manually set as a limit for clear stack or maximum radiation transmittal between S and R. In other words "zero smoke" condition means unimpeded transmittal of the radiation beam from lamp 5, through the path 3 to the target 12 and usually corresponds to a reading of zero on chart 1. Rx is determined by the distance spacing between elements 5 and 6 or the maximum radiation available, with zero smoke, as determined by distance.

The amplifier and motor control circuit 21 may be like that disclosed in the copending application S. N. 693,290 of Anthony J. Hornfeck, now Patent 2,544,790, and serves to control the rotation of a motor 23 which is arranged to position the slidewire contact 20 along SW and to simultaneously position the pen 24 relative to an index 25 and to the time revoluble chart 1.

It will be evident that the amplifier 21 is inserted in the conductor 19, 19' and is sensitive to polarity and magnitude of unbalance between 20 and 19'. We have found that under certain conditions it is not most desirable to directly cause means to operate as the result of unbalance of network 13 to return the network 13 to balance. It would be necessary with such a system to provide leads from a balanceable network having resistances so designed as to subject the operating means only to voltages proportional to the actual unbalance of the network. When the changes of the variable condition are such as to effect only a very slight unbalance of the network, it is difficult to produce a change in the resistance of the network to return the latter to a balanced condition. Instead of rebalancing the network 13 we have found that better results may be obtained by subjecting the output voltage of the network to an opposing voltage which is regulated by means operating in response to the difference between the two voltages.

A close adjustment of the opposing voltage may be obtained because substantial operation of the operating means can be made to produce only slight changes in voltage. The resistances of the leads from the network with such an arrangement do not affect the operation of the system. This arrangement does require, however, that the voltage applied to the network for energizing the latter and voltage applied to the system for producing the opposing voltage be maintained directly proportional to each other. Thus a common transformer 17 produces the voltage for the network 13 as well as the reference voltage across P, B to which the network unbalance voltage through SW is compared. Any changes in voltage $E_0$ at the source will thus be reflected proportionately to both ends of the network. The arrangement provides a particularly stable zero not affected by changes in range, thus the null adjustment 18, 19' and range adjustment P are relatively independent of each other.

The operation is in general as follows:

With the target 12 completely blocked (100% smoke) the null adjustment 18 first establishes the correct chart reading for 100% smoke. With the radiation beam unimpeded (zero smoke) in its passage through tube 3 the range adjustment P is moved until the pen 24 reads on the chart 1 full radiation transmittal or zero smoke. Rx has been established for the distance between S and R. For any condition of radiation transmittal the system is in balance and the pen 24 indicates and records the corresponding value of smoke on the 0 to 100% scale.

A change in smoke (radiation transmittal) results in a change in electrical resistance of filament 12 with resulting change in value $e_0$. The direction and extent of change in smoke predicates the magnitude of voltage $e_0$ of the network 13 across conductors 19, 19'. Such unbalance is compared with the reference voltage $e_x$ across B, P and the difference is effective across 20, 19' upon amplifier 21, activating the latter to cause the motor 23 to rotate in proper direction to move the contact 20 along SW until the difference is reduced to zero and the system is again in balance. Such rotation of the motor also moves the pen 24 until it reaches the new value of smoke upon the index 25 and chart 1.

Inasmuch as the value of electrical resistance 12 (in bridge 13) varies with temperature it will vary not only with temperature resulting from radiation received from source 5 but also due to ambient temperature changes. For this reason compensating cell 10 is subjected to the same ambient conditions as is filament 12 but is shielded from the radiation beam.

It will be noted that we preferably utilize as supply voltage $E_0$ a source of alternating current common to source S and to transformer 17. Thus the entire system is sensitive to variations in supply voltage although not necessarily in the same direction or amount. Variations in $E_0$ will not usually exceed $\pm 10\%$ from 115 volts and in this range affect the radiation emission of S, the supply voltage $E_b$ to bridge 13, and the comparison voltage $e_x$ across P, B, all in the same direction and substantially linearly. The effect of voltage variations in $E_0$ upon the radiation emission and upon $e_x$ is in the direction of self-compensation. Increase in $E_0$ increases the radiation falling upon filament 12 and increases $e_0$. This greater $e_0$ is compared to a voltage across P, B which has also increased with increase in $E_0$; thus the difference effective in 21 is relatively unchanged and little if any movement of 20, over SW, results.

However, the effect of variations in $E_0$ upon $E_b$ is not similarly taken care of and may introduce considerable error unless certain precautions are observed. We have found that this adverse effect may be adequately compensated out by properly choosing the normal value for $E_b$ and for the particular arrangement and values of circuit now being explained we prefer to use a value of approximately 7.5 volts.

Figure 2:
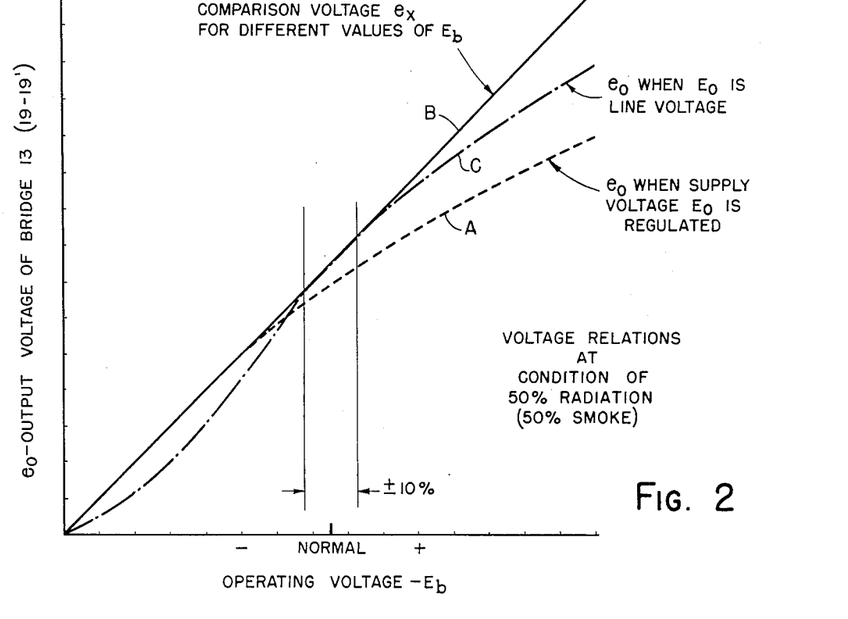
Fig. 2 is a graph of electrical values for the system of Fig. 1.

The curves of Fig. 2 are based upon a condition of 50% radiation (50% smoke) falling upon bolometer filament 12. Similar curves may be drawn for conditions toward the zero or 100% smoke limits of operation and although divergences may appear, it will be evident that errors are minimized by designing at the mid-point of 50%.

The electrical resistance of bolometer filament 12 varies with temperature as a result of self-heating from $E_b$ and as a receiver of radiant energy from S. Somewhat over half of the heating is caused by self-heating from $E_b$ and thus the value of $E_b$ assumes considerable importance in its effect upon $e_0$. A variation of $\pm 10\%$ in $E_0$ causes substantially $\pm 10\%$ change in $E_b$ at any design value of $E_b$ but the overall effect will vary with the selected design value of $E_b$. Thus we have found it advisable to establish a normal operating voltage of 7.5 for $E_b$ on the basis that $\pm 10\%$ variation in $E_0$ (and $E_b$) across this basic value will result in a minimum of measuring error for the particular embodiment being described.

In Fig. 2 we have plotted, for 50% radiation receipt at target 12, the relation between the various voltages just discussed. Curve A shows that the unbalance signal $e_0$ is substantially linear over the lower values of $E_b$ operating voltages and then begins to droop (assuming $E_0$ is unvarying) due to the heating characteristics of R previously mentioned. Such a signal $e_0$ is compared against the fixed voltage $e_x$ across P, B because the difference or balance-back voltage (curve B) is linear in its relation to $E_b$.

But, we desire to avoid the necessity of supplying regulated voltage to $E_b$ inasmuch as we do not need to do so for S or P, B. If the voltage supply $E_0$ is line voltage and is a common source for S, P, B and $E_b$ we find (curve C) that $e_0$ is substantially linear with respect to $E_b$ for a variation of at least $\pm 10\%$ across $E_b = 7.5$ volts for this particular set of conditions and values. Curve C is a plot of $e_0$ when $E_0$ is line voltage and (as compared to curve A) is in substantially linear coincidence with B through an $E_b$ value of 7.5 volts $\pm 10\%$. We have therefore found 7.5 volts is dictated as the normal operating voltage for $E_b$ and find that all normal variations in line voltage $E_0$ are without detrimental effect upon the accuracy of measurement.

In general, then (assuming $E_b$ remains constant) an increase in line voltage $E_0$ at source 5 and transformer secondary 22 results in an increase in radiation upon 12, and an increase in signal $e_0$ (non-linear curve A) to be compared with an increased voltage $e_x$ (linear curve B). Had $e_0$ increased linearly (i. e. if A were linear) the difference between $e_0$ and $e_x$ would remain unchanged (self-compensating). But $e_0$ does not increase linearly (see curve A) and $E_b$ does not remain constant (see curve C) so that under operating conditions of S, $E_b$ and $e_x$ all subjected to the same line voltage $E_0$ variation in the voltage $e_0$ of curve C is to be compared to $e_x$ of curve B and we have found these to be substantially coincident for values of $E_b$ of 7.5 volts $\pm 10\%$. We therefore use a transformer secondary 16 to give a normal $E_b$ of 7.5 volts and the divergence of curves B and C under this condition, caused by smoke obstruction between S and R represent the value of the balance-back voltage effecting the amplifier 21 in producing rotation of motor 23 to shift 20 along SW until such difference reduces to 0 and the system is again in balance.

Figure 3:
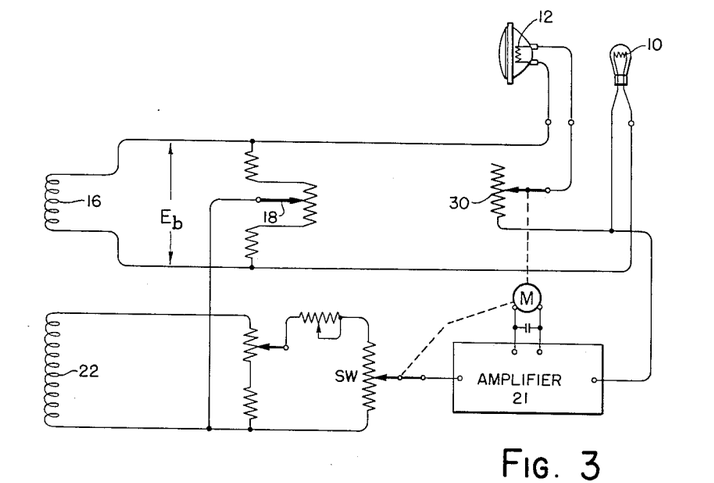
Fig. 3 is a modification of a portion of Fig. 1.

The line voltage variation self-compensation just discussed is quite satisfactory at 50% radiation transmission but is still very slightly in error in the region of 100% radiation transmission. If greater stability with line voltage is required at high values of transmitted radiation (less smoke) the compensating circuit of Fig. 3 may be used requiring an auxiliary compensating slide-wire 30 which is moved by motor 23 simultaneously with SW arm 20.

The apparatus and circuit which we have invented have many advantages over prior "smoke density meters" which have previously been of the photo-tube or photo-cell type. Among the advantages may be mentioned the following:

1. The bolometer receiver 6 is evacuated to minimize loss from the target, through convection or conduction, of radiant energy which the target has received either by direct impingement or by reflection from the paraboloidal inner surface of the housing.

2. Varying or excessive ambient temperatures are of little concern. Variations in the electrical resistance of filament 12 caused by variations in ambient temperature are compensated for by filament 10. Temperatures up to at least 500° F. will not cause structural damage while higher ambient temperature limits are established only by the melting point of soldered electrical connections external of the envelopes or by the softening temperature of the glass envelopes. On the other hand photocell or photo-tube devices are seriously limited in their application to smoke stacks or ducts with complete break-down limit at about 125° F. and possible impairment of accuracy even before that temperature is reached.

3. As the filaments 12 and 10 are each hermetically sealed in a glass envelope they are not subject to the deleterious effects of the corrosive gases of combustion or of other processes. The barrier-layer photocell is particularly susceptible because it is not sealed from the atmosphere.

4. The bolometer structure is highly resistant to damage or accuracy shift from handling, vibration, etc.

5. The radiation reception is several hundred times that of the target alone due to the paraboloidal reflecting surface with the target located at its focal point.

6. The term "fatigue" has been used to indicate an inherent initial drift in the current output of photosensitive surfaces when they are exposed to light. This may be temporary or permanent. The filament 12 of our bolometer 6 is not so affected.

7. Most prior systems require lens focusing systems at the source and/or receiver, thus increasing the number of glass surfaces susceptible to dust and dirt collection or damage.

8. Our system employs a simple A.-C. circuit with well established commercial instruments and without the necessity of any source of direct current. Prior systems require a separate D.-C. source for the photo-tube or have a very minute D.-C. output from a photo-cell, with considerably more equipment required, and the lack of a satisfactory commercial D.-C. recorder.

9. We provide a fixed dimension sample path for the radiation beam to traverse and the necessary compensators for source-to-receiver distance variation, ambient temperature changes, and for line voltage fluctuations.

10. The receptive or sensitive ability of the target to the total thermal radiation emitted from the source may be compared as follows keeping in mind that these are examples only and not specific limitations.

Energy emitted by spotlight source is about:
   20% in the visible range
   80% in the infra-red range
Photoelectric or barrier-layer cell is sensitive to about:
   10% ultraviolet
   90% visible
   0% infra-red
Phototube is sensitive to about:
   40% visible
   60% infra-red
Comparative sensitivity target to source:
   Bolometer 100% of total radiation emitted
   Photo-cell 18%
   Photo-tube 56%

The term "turbidity" of a fluid may be considered as generic to smoke or ash in flue gases, suspended solids in a liquid, or any radiation absorbing or obstructing matter disposed in quiescent or flowing fluid. Thus, the system we have described is, in general, applicable to the measurement of turbidity of any fluid and is not limited to use as a smoke density meter.

Figure 4:
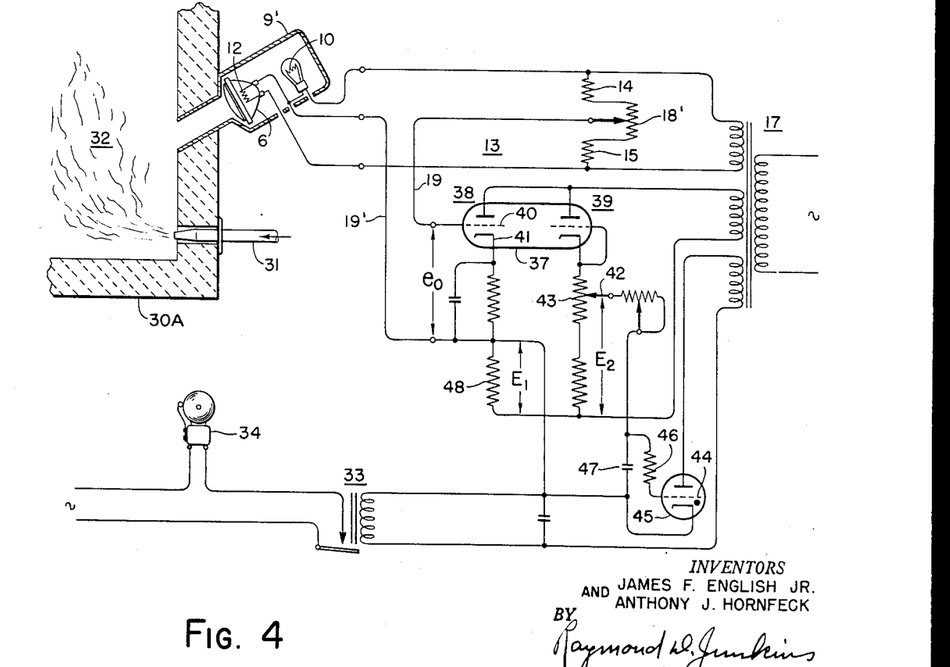
Fig. 4 diagrammatically illustrates a flame failure alarm circuit.

In Fig. 4 we show diagrammatically an adaptation of our invention wherein a circuit is triggered when total radiation effective upon the bolometer target exceeds a predetermined value. Specifically, we illustrate a flame failure alarm system wherein the bolometer is sensitive to the presence or absence of flame although it might equally as well be the presence or absence of any thermal radiation emitting source.

A furnace enclosure 30A is supplied with fluid fuel through a burner 31 to form a flame 32. The housing 9' is arranged so that the bolometer 6 looks at the flame and the target 12 receives thermal radiation from the flame. As in Fig. 1 the target 12 and the compensating filament 10 forms two legs of an A.-C. bridge 13 having fixed resistance legs 14, 15 as well as an adjustable resistance 13'. Power is supplied to the bridge from a transformer 17. A conjugate conductor 19, 19' provides a signal voltage $e_0$ which may have zero value when flame is present and a finite value when flame is absent, or vice versa.

In the arrangement of Fig. 4, the signal voltage $e_0$ is supplied to an electronic relay such as is described and claimed in the copending application of Anthony J. Hornfeck, Serial No. 633,891 and controls the activation of a relay 33 which in turn controls an alarm bell 34. Normally, when flame 32 is present, the relay 33 is deenergized and the alarm bell 34 is quiet. If the flame 32 fails the absence of radiation upon the target 12 causes the relay circuit to energize the relay 33 and sound the alarm 34. It appears unnecessary to illustrate and describe switches or similar common apparatus for the circuit of the bell 34 or for interlocking so that it may or may not continue to ring until the flame is again established.

The circuit is so adjusted that the bridge 13 is balanced ($e_0=0$) when the target 12 receives sufficient thermal radiation representing a rather hypothetical condition between presence and absence of flame. When flame exists, the signal voltage $e_0$ will be of one phase, and when flame is absent the signal voltage $e_0$ will be of opposite phase. The magnitude of $e_0$ of either phase is not critical but must be above a predetermined minimum value.

A phase discriminatory device 37 is shown conveniently as a single envelope tube containing triodes 38 and 39 of which 39 is connected as a rectifier whose function is to supply a reference D.-C. voltage $E_2$ for 38. The voltage $e_0$ is impressed between the grid 40 and cathode 41 of triode 38 controlling a D.-C. voltage $E_1$ to be compared to $E_2$. The grid-cathode circuits of the tubes 38 and 39 are energized from an additional secondary of the transformer 17 to provide proper phase relation.

When flame is present at 32 and signal voltage $e_0$ is of one phase then tube 38 conducts a predetermined amount of current resulting in a voltage drop $E_1$ in cathode resistor 48. An adjustable contact 42 may be so positioned along cathode resistance 43 for rectifier 39 that $E_2$ is slightly less than $E_1$. The voltage difference between $E_1$ and $E_2$ is most negative at 42 is applied to the grid 44 of a gas filled tube 45 such as a thyratron, through a resistor 46 and a capacitor 47. The voltage thus applied to the grid of the thyratron 45 is preferably just negative enough to prevent 45 from firing.

Inasmuch as the relay being described provides an on-off control of the alarm 34 it will be appreciated that we desire to fire the tube 45 and energize the relay 33 for the alarm 34 only when flame fails and thermal radiation received by the target 12 falls below a predetermined value. At any time when flame is present the tube 45 does not fire or conduct because the signal voltage $e_0$ is in phase with the plate voltage of triode 38 and gives an increase in plate current over balance condition. This results in an increased voltage drop $E_1$ across resistor 48 and a more negative potential on grid 44.

When flame fails, the phase of the signal $e_0$ changes as applied to the grid 40 of the discriminator triode 38. The voltage now is out of phase with the plate voltage of 38, so that the plate current is reduced and E₁ becomes less thus reducing the negative voltage applied to the grid of thyratron 45 which fires completing the circuit to energize relay 33 and sound the alarm 34.

Figure 5:
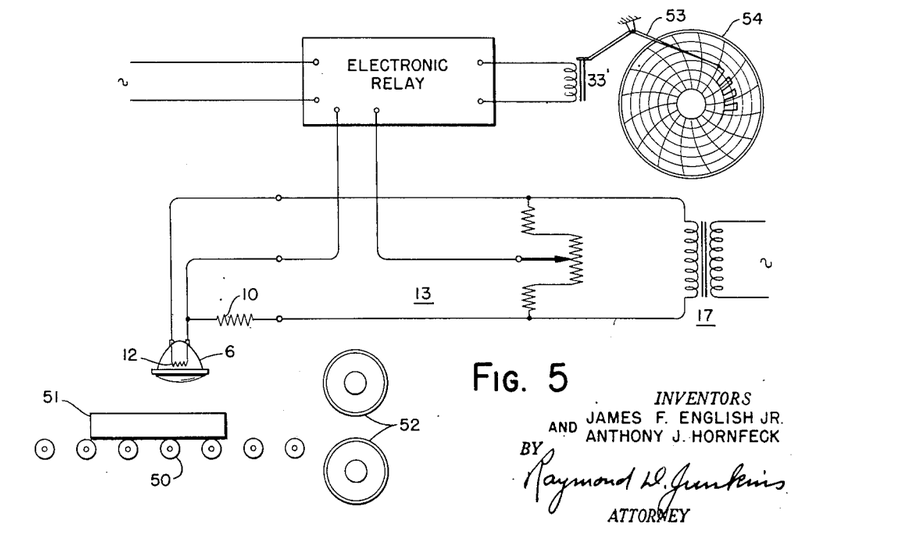
Fig. 5 illustrates an adaptation of our invention to the counting of moving objects.

In Fig. 5 we illustrate an arrangement for continuously recording the speed and frequency of passing of heated objects moving by the target 12. Specifically, the drawing represents our system in connection with a steel rolling mill having table rollers 50 moving a heated billet 51 toward or away from mill rolls 52. The bolometer 6 is firmly mounted to lock at the billet as it passes (in either direction) a definite location in its path.

As explained in connection with Fig. 4 the circuit is arranged to be sensitive to a value of received thermal radiation either above or below a certain value which may thus be the presence or absence of the heated object before the look of the bolometer. When the billet is in front of the bolometer the electronic relay dictates a de-energized relay 33' and when the billet is no longer seen by the bolometer then the relay 33' is energized. The reverse operation may readily be had if desired.

The relay 33' is arranged to actuate a recording pen 53 (shown diagrammatically) producing a record upon a time moved chart 54. The record is shown as having a base line of pen marking when the relay 33' is deenergized and a second line, spaced from the first, corresponding to relay 33' being energized. The resulting record will be a series of teeth each representing the passing of the billet before the bolometer 6. The chart 54 may be graduated on a time basis so that the operator may readily ascertain from an examination thereof the length of time it took the billet to pass the bolometer and the length of time between such passages and consequently the frequency of passage. In such an operation there will usually be a pause between the finishing of one billet and the beginning of another and the new billet will always pass the bolometer in the same direction approaching the mill roll. It is thus readily ascertained that the first tooth of the record is the first travel of the billet towards the rolls 52 (if that is the correct sequence) and thereafter each alternate tooth is a passage of approach to the rolls 52 (or alternatively of return from the rolls). Furthermore, as the cross section of the billet is reduced by passing it through the mill, its time of passage in front of the bolometer 6 is increased and this will clearly show upon the chart record. The chart record may therefore also give relative information as to the extent and rate of elongation by comparing the time length of the various teeth of the record. It is apparent that the speed of the chart 54 will be chosen to best present the information desired and furthermore that the chart 54 may be of the circular type or of a rectilinear type if desired.

Figure 6:
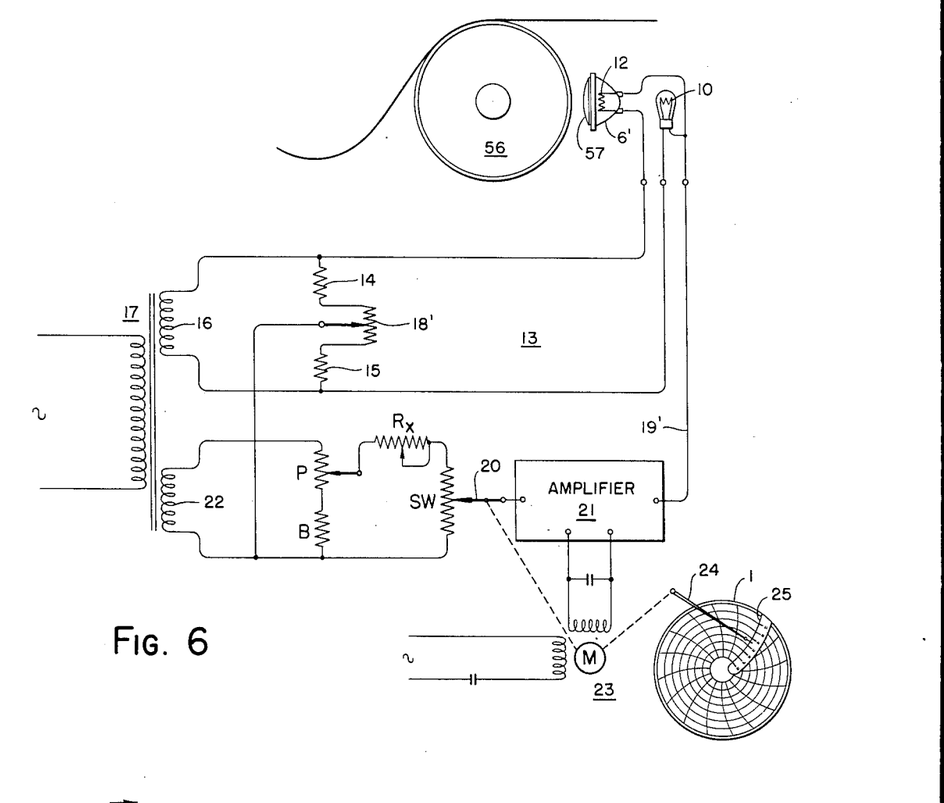
Fig. 6 is an arrangement for measuring temperatures.

The arrangement of Fig. 6 provides an indication and record of the surface temperature of a paper machine roll 56, or the like, which may be at a temperature below 500° F. radiating thermal energy at a low level and completely in the infra-red range. As mentioned, the window of the bolometer 6 is usually clear glass which permits free ingress of radiation in the visible range and substantially free ingress of infra-red at high energy level. As the source level of infra-red is lowered the use of a thick lens window results in the attenuation of wave lengths beyond 2.5μ. Bolometer 6' of Fig. 6 may have a window 57 of quartz or other suitable material which passes a large proportion of infra-red radiation.

The circuit of Fig. 6 is similar to that of Fig. 1 and is adjusted to record upon the chart 1 over the temperature range expected for the surface of the roll 56.

If it is desired to measure the temperature of the moving billet of Fig. 5 this may be done with the arrangement of Fig. 6 with the bolometer 6 having a clear window and the circuit adjusted for the proper temperature range. A record to rectilinear coordinates so produced may look like that of Fig. 7, which is not necessarily to any particular scale.

Figure 7:
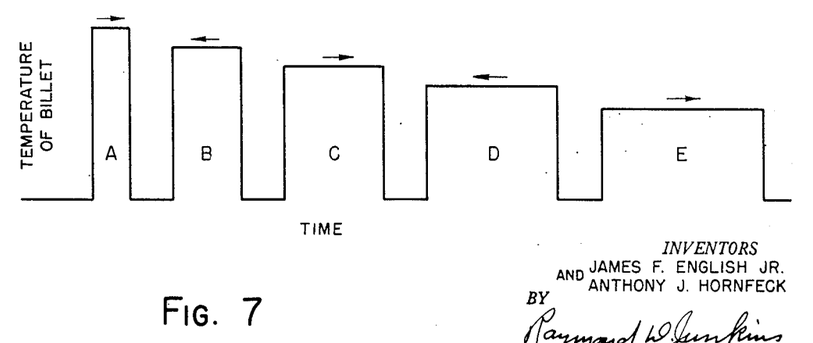
Fig. 7 is a sample chart record.

Temperature of the billet is automatically plotted against time. A represents the initial approach of the highly heated billet to the mill roll. B is the return pass, C the second approach, D the second return, E the third approach, etc. As the passes continue the temperature of the billet decreases. As the cross-section of the billet is reduced its length increases and it takes more time to pass the bolometer thus the increase in time of B, C, D, E at a dropping temperature. Other valuable information may be deduced from such a record.

While we have chosen to illustrate and describe certain preferred embodiments of our invention, this is not to be considered as limiting, but as illustrative only.

What we claim as new and desire to secure by Letters Patent of the United States is:

1. The method of continuously determining the percentage of thermal radiation passing through a flowing fluid which includes defining a flow path of predetermined length and cross-section generally at right angles to the direction of flow, delivering thermal radiation along said path from an area beyond an end of said length having substantial uniform radiation throughout said cross-section, introducing fluid into said path at right angles to its length, receiving the thermal radiation passed through said path at a position beyond its opposite end from the area and for the full cross-section, concentrating said received radiation onto a target capable of producing a signal voltage representative of the total radiation passing through the whole cross-section of the path, establishing a fixed reference voltage, comparing the signal voltage and the reference voltage and using the difference to obtain a measure of radiation transmitted through the fluid.

2. The method of claim 1 including the step of delivering non-obstructing fluid toward the said flow path in small quantities from positions intermediate the path ends and the adjacent radiating and receiving areas.

3. The method of claim 1 including the step of varying an electrical resistance value in accordance with received total thermal radiation passed through the fluid to establish the signal voltage.

4. Apparatus for continuously measuring the value of a variable, including in combination, a balanceable A.-C. network producing an output signal voltage of one phase under all conditions and of a magnitude determined by the magnitude of the variable, independent circuit means providing a fixed reference voltage of one phase only, means comparing said signal and fixed voltages continuously, means responsive to both the phase and magnitude of any voltage difference determined by said means, motive means whose direction and extent of movement is under the control of said responsive means, an indicator of the value of the variable, and electrical means for reducing said voltage difference to zero, both the indicator and the electrical means positioned by the motive means.

5. Apparatus for measuring thermal radiation including in combination, an electric energy source of thermal radiation, a flowing fluid stream, a tube extending transversely of said stream and beyond its confines, coordinated opposed openings in said tube walls for the passage of a portion of said stream transversely of the tube axis, means to direct said radiation axially into said tube substantially uniformly throughout its cross-section, a bolometer, means concentrating the total radiation passing through the tube onto said bolometer, said bolometer including a resistance thermometer target comprising one leg of an A.-C. network, an output for said network, said network having components adjusted to provide in said output a signal voltage representative of the percent total radiation which reaches the target through the tube, circuit means providing a reference voltage to which the signal voltage is continuously compared, means responsive to difference in said voltages, motive means under control of said last named means, an indicator for total thermal radiation received by said target, and electrical means for reducing the voltage difference to zero, both the indicator and the electrical means positioned by the motive means.

6. The apparatus as claimed in claim 5 in which the tube passes through a chimney having negative pressure therein, the ends of the tube being closed by housings for the source and receiver for radiations, and air vents in the tube between said closures and the ends of said slots.

7. The combination of claim 5 wherein the said radiation source, said A.-C. network, and said circuit are all supplied from a common A.-C. supply source, and means for compensating the entire system for variations in voltage of the A.-C. supply source.

8. The combination of claim 5 wherein adjustable means is provided in said network for compensating the latter for distance between the source and target.

9. Apparatus for continuously determining the percent total thermal radiation passed through a flowing fluid containing radiation absorbing or obstructing matter, including in combination, a source of thermal radiation arranged to direct a beam in confined path through a fixed size sample stream of the fluid, a bolometer spaced from said source in alignment with said beam and having a target arranged to be receptive of total thermal radiation of said beam which succeeds in passing through said sample stream, said target comprising a resistance thermometer leg in an electric network having an A.-C. input and an output circuit, the elements of said network being adjusted for balance and zero output when the fluid provides 100% radiation stoppage, unbalance producing a signal voltage in the output representative of the total thermal radiation effective on the target, means providing a fixed reference voltage from an A.-C. source subject to the same fluctuation as that of said input, circuit means continuously comparing the signal and reference voltages, and motive means energized responsive to a difference in said voltages.

10. The apparatus of claim 9 including circuit means compensating for variations in the energy level of total thermal radiation emitted by said source.

11. The apparatus of claim 9 including an A.-C. supply source common to the radiation source, the network, and the comparison circuit means, and electric means connected to said A.-C. supply providing an optimum value supply voltage to said network, whereby at 50% radiation the output voltage varies in a straight line relationship to the input voltage throughout a ±10% variation in supply voltage.

12. The apparatus of claim 11 wherein the optimum supply voltage to the network is within the range 7.5 volts±10% when the A.-C. supply source is 115 volts±10%.

13. The apparatus of claim 11 including in said network an adjustable means positioned by said motive means for compensating the signal voltage for supply voltage variations having a varying effect with amount of received radiation.

14. Apparatus for signalling the presence or absence of a source of thermal radiation, including in combination, a bolometer located to look at the space location where the source may be expected to appear, said bolometer including a single A.-C. resistance thermometer target receptive of thermal radiant energy from the source, an electric network including said resistance and arranged to provide a signal voltage of one phase upon presence of the source and of opposite phase upon absence of the source, means in said network to compensate for ambient temperature, signal means to advise the presence or absence of the source, and phase sensitive circuit means under the control of said signal voltage adapted to actuate the signal means.

15. The apparatus of claim 14 wherein the signal means includes a recording device adapted to record on a time-actuated chart the frequency of appearance and the length of time of appearance of the radiation source in the look of the bolometer target.

16. The apparatus of claim 15 including circuit means for additionally recording the temperature of the source when it exists in the look of the bolometer target.

JAMES F. ENGLISH, Jr.
ANTHONY J. HORNFECK.

REFERENCES CITED

The following references are of record in the file of this patent:

UNITED STATES PATENTS

| Number | Name | Date |
|---|---|---|
| 1,758,088 | Schmick | May 13, 1930 |
| 1,936,707 | Buchholz | Nov. 28, 1933 |
| 2,150,467 | Stain | Mar. 14, 1939 |
| 2,244,732 | Schmitt | June 10, 1941 |
| 2,363,472 | Ryder | Nov. 21, 1944 |
| 2,396,420 | Hayward et al. | Mar. 12, 1946 |
| 2,407,838 | Kliever | Sept. 17, 1946 |
| 2,451,572 | Moore | Oct. 19, 1948 |
| 2,470,926 | Gieseke | May 24, 1949 |